US009177373B2

(12) United States Patent
Dikici et al.

(10) Patent No.: US 9,177,373 B2
(45) Date of Patent: Nov. 3, 2015

(54) SAMPLE POINT-BASED, BLOB-LIKE, CLOSED-SURFACE DELINEATION APPROACH

(76) Inventors: Engin Dikici, Jacksonville, FL (US); Richard D. White, Ponte Vedra Beach, FL (US)

( * ) Notice: Subject to any disclaimer, the term of this patent is extended or adjusted under 35 U.S.C. 154(b) by 438 days.

(21) Appl. No.: 13/576,008

(22) PCT Filed: Feb. 4, 2011

(86) PCT No.: PCT/US2011/023828
§ 371 (c)(1),
(2), (4) Date: Mar. 12, 2013

(87) PCT Pub. No.: WO2011/097537
PCT Pub. Date: Aug. 11, 2011

(65) Prior Publication Data
US 2013/0195334 A1 Aug. 1, 2013

Related U.S. Application Data

(60) Provisional application No. 61/301,481, filed on Feb. 4, 2010.

(51) Int. Cl.
*G06T 7/00* (2006.01)
*G06T 19/00* (2011.01)

(52) U.S. Cl.
CPC ............ *G06T 7/0012* (2013.01); *G06T 7/0083* (2013.01); *G06T 7/0089* (2013.01); *G06T 19/00* (2013.01); *G06T 2207/20116* (2013.01); *G06T 2207/20156* (2013.01); *G06T 2210/41* (2013.01)

(58) Field of Classification Search
CPC ... G06T 7/0012; G06T 7/0083; G06T 7/0089; G06T 11/003; G06T 11/008; G06T 17/30; G06T 19/00; G06T 2207/20112; G06T 2207/20116; G06T 2207/20156; G06T 2207/20168
See application file for complete search history.

(56) References Cited

U.S. PATENT DOCUMENTS

| 6,606,094 B1 | 8/2003 | Jones, Jr. ...................... 345/467 |
| 6,674,879 B1 | 1/2004 | Weisman et al. ............. 382/128 |

(Continued)

OTHER PUBLICATIONS

Yang, Jing et al., 3D image segmentation of deformable objects with joint shape-intensity prior models using level sets, Medical Image Analysis, Sep. 2004, pp. 285-294, vol. 8, Issue 3.

(Continued)

*Primary Examiner* — Andrew W Johns
(74) *Attorney, Agent, or Firm* — Miles & Stockbridge P.C.; David R. Schaffer (57) ABSTRACT

A method, system, computer program product, and computer readable media for a semi-automated surface extraction approach to delineating an object of interest (OOI) from 3-D medical image data sets. This approach is imaging modality independent and results in enhanced displays of blob-like anatomies, including internal organs (e.g., cardiac chambers, liver) or disease processes (e.g., tumor masses). In an embodiment of the method: (I) the user provides multiple representative points located on the surface of the OOI using a Multi-Planar Reconstruction (MPR) tool; (2) those Cartesian points are translated into polar coordinates (each 3-D point is represented via two angles and a height), which uniquely define the surface points for a radial object, (3) a Radial-Basis Function (RBF) interpolator, with a Thin Plate Spline (TPS) radial function, finds the height function for the polar domain, and (4) polar domain representation of the OOI surface is converted back to Cartesian coordinates.

20 Claims, 8 Drawing Sheets

(56) References Cited

U.S. PATENT DOCUMENTS

| | | | |
|---|---|---|---|
| 6,785,409 B1 | 8/2004 | Suri | 382/128 |
| 7,486,811 B2 | 2/2009 | Kaufman et al. | 382/128 |
| 7,545,979 B2 | 6/2009 | Fidrich et al. | 382/173 |
| 2003/0038802 A1 | 2/2003 | Johnson et al. | 345/420 |
| 2004/0030255 A1 | 2/2004 | Alfano et al. | 600/476 |
| 2004/0071363 A1 | 4/2004 | Kouri et al. | 382/276 |
| 2005/0231530 A1 | 10/2005 | Liang et al. | 345/619 |
| 2006/0239527 A1 | 10/2006 | Krishnan et al. | 382/128 |
| 2007/0083103 A1 | 4/2007 | Boese et al. | 600/407 |
| 2007/0297657 A1 | 12/2007 | Mattes et al. | 382/128 |
| 2009/0161926 A1 | 6/2009 | Florin et al. | 382/128 |
| 2009/0169076 A1 | 7/2009 | Lobregt et al. | 382/128 |
| 2009/0175515 A1 | 7/2009 | Schummers | 382/128 |
| 2009/0226058 A1 | 9/2009 | Li et al. | 382/128 |
| 2010/0215238 A1* | 8/2010 | Lu et al. | 382/131 |

OTHER PUBLICATIONS

Lorenz, Cristian et al., A comprehensive shape model of the heart, Medical Image Analysis, Aug. 2006, pp. 657-670, vol. 10, Issue 4.

De Bruijne, Marleen et al., Localization and Segmentation of Aortic Endografts Using Marker Detection, IEEE Transactions on Medical Imaging, Apr. 2003, vol. 22, No. 4.

Hong, H. et al., Ventricular shape visualization using selective volume rendering of cardiac datasets, Computers in Biology and Medicine, pp. 481-498, vol. 31, Issue 6, 2001.

International Patent Application No. PCT/US2011/023828—International Search Report and Written Opinion of the International Searching Authority dated Sep. 22, 2011.

* cited by examiner

SAMPLE POINT-BASED, BLOB-LIKE, CLOSED-SURFACE DELINEATION APPROACH

RELATED APPLICATIONS

This application claims the benefit of PCT Application No. PCT/US2011/023828, filed Feb. 4, 2011, now pending, which claims the benefit of U.S. Provisional Application No. 61/301,481, filed Feb. 4, 2010. Each patent application identified above is incorporated herein by reference in its entirety.

BACKGROUND

Medical imaging using advanced three-dimensional (3-D) or four-dimensional (e.g., 3-D plus time dimension) modalities, such as Computed Tomography (CT), Single Photon Emission CT (SPECT), and Magnetic Resonance (MR) has become an important contributor to healthcare, providing valuable information during the screening, diagnostic, treatment planning, clinical monitoring, and/or prognostication phases. There is an increasing need for representation of objects of interest (OOIs) detected by imaging specialists within the produced data sets as display extractions (e.g., colored 3-D renderings) or as quantitative elements (e.g., histograms of changing volume or mass) for improved understanding of anatomic relationships or disease extent by clinicians applying the insights to decision making about patient care. To date, techniques directed at these goals have been largely modality-specific or industry-specific, which typically precludes integrative use across imaging applications.

Radial Basis Functions (RBFs) have been applied to the interpolation of scattered data in various studies. In some studies, RBF-based multilevel approaches were used for the interpolation of scattered height data. More recently, a technique was introduced where the scattered data is interpolated with locally and globally supported basis functions in a hierarchical fashion for 3-D model reconstruction applications. Using constraining scattered data, this approach sought an implicit function separating the inside of the object from its outside using function valued RBFs; this approach produced impressive results when only a few hundred model mesh points and their normal directions were provided. Extending similar concepts to medicine, for example, two different studies used novel formulation of RBFs for the delineation of body part borders. In the first of the two studies, RBFs were fitted to depth maps of skull surfaces in CT image data in order to smoothly interpolate the surface of the skull across regions containing defects; in so doing, this study defined a model for future investigations as it: (1) applied RBFs in a medical setting (i.e., cranioplasty procedure), and (2) compared Thin Plate Splines (TPSs) and Linear Radial Bases (LRBs). In the approach used with the second study, the shapes defined in N dimensions by multiple constraining "seeds"—or reference points—were transformed, creating an (N+1)-dimensional ((N+1)-D) shape; briefly, for generating an (N+1)-D surface: (1) scattered boundary/normal constraints were delineated in multiple N-dimensional (N-D) images, and (2) a stack of N-D constraints underwent variational interpolation to create a single implicit function defining an (N+1)-D shape. This approach can be applied to a variety of topologies. However, when segmenting 3-D images, many constraining seeds, which include the boundary and normal for each seed position, will likely need to be provided for multiple selected 2-D cross-sections; this can be a very labor-intensive process.

SUMMARY

The "blob-like" object delineation approach of the present invention is aimed at overcoming at least some of the disadvantages associated with various object delineation approaches as discussed above. One of the products of a segmentation algorithm is the surface of the object, since the segmentation algorithm localizes the interested object volume and the border of this volume is a surface. The approach of the present invention includes the definition of an interpolator for the purpose of object border extraction. A closed surface based on a small set of scattered points is created using a polar formulation and TPSs. Embodiments of the present invention may include (i.e., comprise) methods, systems, a computer program product, and a computer readable media for a semi-automated segmentation or surface extraction approach to the delineation of an OOI from 3-D image data sets. One or more embodiments include an RBF interpolator for surface reconstruction or extraction, which performs interpolation in the polar domain. This novel approach includes the following advantages and differences as compared with other approaches: (1) it uses very sparse input sets, consisting of less than ten unordered data points in most cases, (2) it uses a polar domain for the computation, making it suitable for radial shape extraction with high accuracy, and (3) it does not use constraining points or seeds, allowing for intuitive user-friendly interactivity. Additionally, the present invention allows for adjusting the reconstructed or extracted surface in real-time, without requiring any image processing.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that equivalent constructions insofar as they do not depart from the spirit and scope of the present invention, are included in the present invention.

For a better understanding of the invention, its operating advantages, and the specific objects attained by its uses, reference should be had to the accompanying drawings and descriptive matter which illustrate alternative embodiments of the invention.

DETAILED DESCRIPTION

The embodiments of the present invention provide for delineating the borders of 3-D OOIs displayed in, for example, medical images, which in turn may enhance visualization options for: (1) improved diagnosis, (2) better performance of image-guided procedures, and (3) time savings in interpretation of images. The interactive "blob-shape" object delineation approach of the present invention is: (1) modality independent; (2) industry independent; (3) practical and intuitive to use; and (4) suitable for easy integration into any imaging tool or Picture Archiving and Communication System (PACS) program. Many major medical imaging or PACS programs use two-dimension based image painting tools, which can be fairly impractical. The embodiments can be used for any OOI or anatomy that has a blob-like surface shape without any expansions and/or investigations prior to usage.

Figure 1:
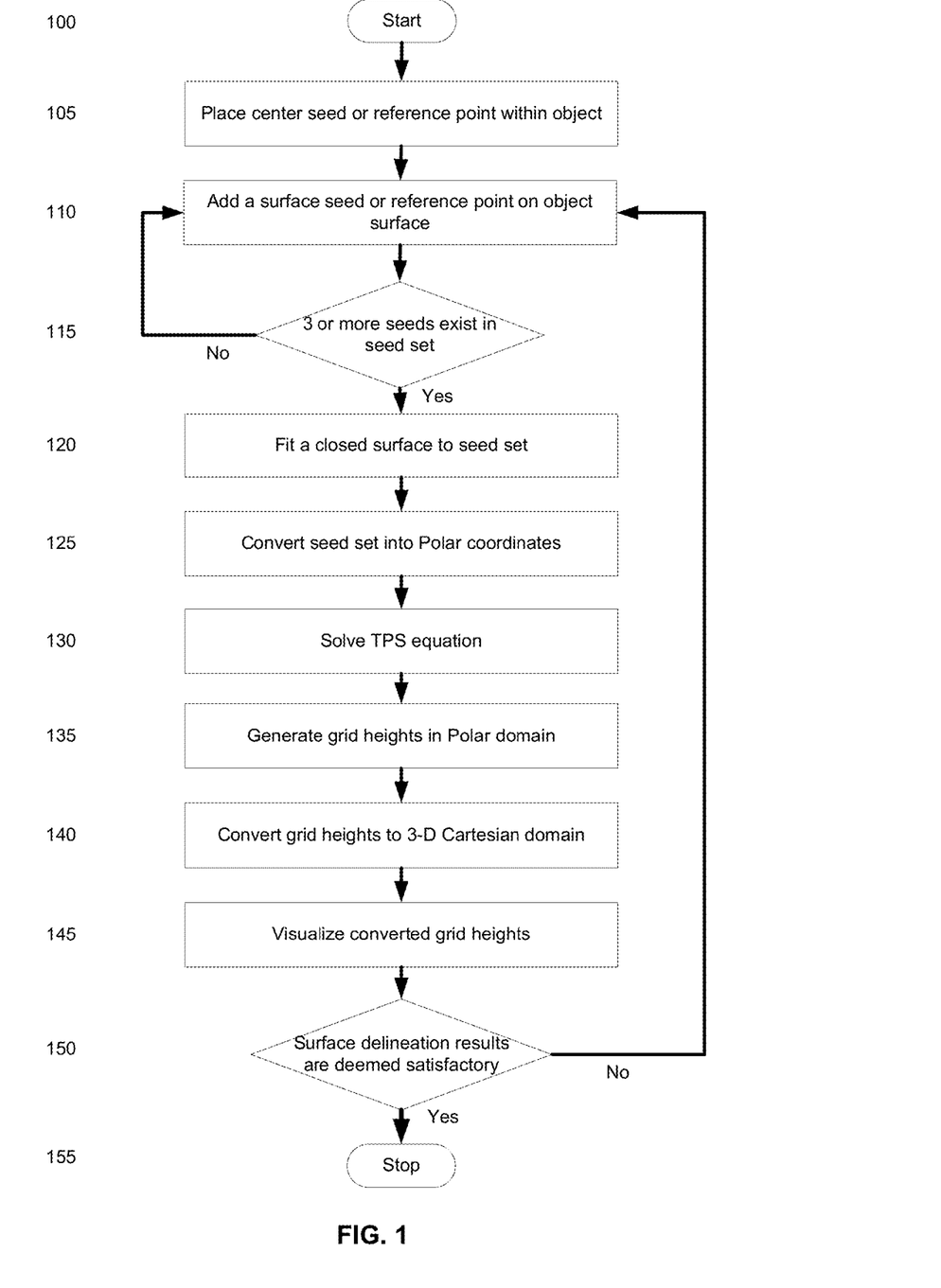
FIG. 1 shows an exemplary process for delineating the surface of an OOI in accordance with the present invention.

Turning to FIG. 1, a work flow diagram is shown, depicting an exemplary method for delineating the surface of an OOI in accordance with the present invention. A reference point or seed is placed at some point centrally within a blob-shaped object (e.g., nodule, heart chamber, tumor, etc.) that is to be segmented for improved boundary delineation [105]. The seed—aka "center seed"—may be placed by a medical expert, imaging specialist, or other qualified person, for example, using a Multi-Planar Reconstruction (MPR) tool or other suitable imaging tool, for example. Using the tool, an additional three or more unordered seeds—aka "surface seeds"—are then placed randomly along the border of the object [110, 115]. The best closed surface is then automatically fitted such that the center seed is in the object and the surface seeds are on the detected 3-D surface of the object [120]. More specifically, the set of points or seeds are provided in a 3-D Cartesian coordinate system, and then the points are converted into polar coordinates [125]. A "Solve TPS equation" TPS-based interpolator is then defined in the polar domain [130], and grid heights corresponding to the placed seeds are calculated/generated—in the polar domain—in a preferred sampling rate using the solved spline equation [135]. Finally, the calculated grid heights are converted back to the 3-D Cartesian coordinate system [140] and visualized or mapped on the input image-data volume [145]. The total turn-around time for the conversion to polar coordinates, height calculation, conversion to Cartesian coordinates, and visualization is less than or equal to ten milliseconds (10 ms). The surface delineating method of the present invention guarantees that the placed surface seeds will be located on the fitted surface. The overall surface delineating process generally takes less than 0.2 seconds to complete. An assessment can be made as to whether the surface delineation results are satisfactory [150]. If the generated surface does not fit the object as desired, an arbitrary number of additional surface seeds may be placed for rapid refitting and improved surface delineation; the process is repeated, with visual feedback provided in less than 10 ms.

The method for delineating the surface of an OOI does not use the orientation of the OOI (e.g., interested anatomy) for segmentation purposes. Additionally, the set of selected points does not have to be a subset of predefined landmark positions for the OOI. Rather, the method uses a scattered point set to define an object surface. The method does not require a database or "knowledge base" search, and does not maintain a database pertaining to the physical geometry of the OOI. The method does not impose constraints upon the image acquisition process and does not require multiple image acquisitions of the OOI. The method does not require or include modality-specific image processing techniques (such as internal edge detection) for fitting surfaces, but solely uses the seed positions provided by the user. For a given set of seed points, the method returns the same result, independent of image characteristics; i.e., results do not vary based on image characteristics. During the surface extraction process, no image processing algorithms are performed. In contrast with some image segmentation tools, the system and method of the present invention do not use image data during the surface extraction/delineation process. For example, image domain data (i.e., relating to the specific physical shape or anatomy of an OOI) is not utilized in the surface extraction/delineation process.

The surface fitting [120] of FIG. 1 for a given center seed and n surface seeds of a blob-like object is described in more detail as follows.

Figure 2A:
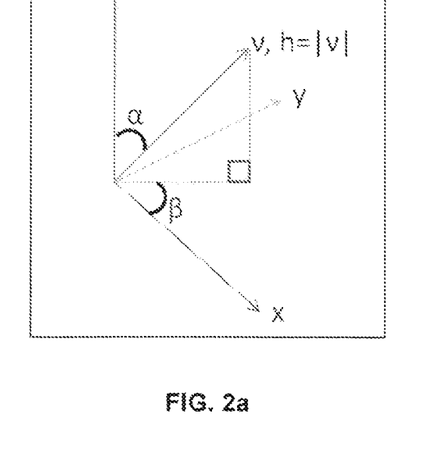
FIG. 2a shows polar representation of an exemplary point delineated on a 3-D coordinate system in accordance with the present invention.

First, the surface of the blob-like object is formulated with spherical coordinates. This coordinate system is referenced to the center seed position, and arbitrary orthogonal x, y, and z axes are selected. Each spherical position on the fitted surface can be represented as an angle pair $(\alpha, \beta)$. This is illustrated in FIG. 2a, where for a given centralized vector v, angular values $\alpha$, $\beta$ and length h are shown.

Next, let $P_1 = (x_1, y_1, z_1)$, $P_2 = (x_2, y_2, z_2)$, ..., $P_n = (x_n, y_n, z_n)$ be the n points delineated on the 3-D Cartesian coordinate system and represent a set P. From the set P, define a normalized and centralized point set $\acute{P}$ where, $$\forall P_m \in P, \acute{P}_m = (P_m - \overline{P})/|P_m - \overline{P}| \text{ and } \overline{P} = \Sigma_{i=0}^{n} P_i/n.$$

Then by using $\acute{P}$, define a polar point set Q where, $$\forall \acute{P}_m \in \acute{P}, Q_m = (\alpha_m, \beta_m, h_m) \text{ and } \alpha_m = \arccos(\acute{P}_m \times (0, 0, 1)),$$

$$\beta_m = \arctan\left(\frac{\acute{P}_m(y)}{\acute{P}_m(z)}\right), h_m = |P_m - \overline{P}|.$$

The problem can then be formulated as an interpolation problem, where the heights for some of the spherical coordinates are already known and the rest are interpolated based on the known heights. The spherical coordinate height is the distance of the point or seed to the center seed position. Therefore, height values exist for the given surface seeds' spherical positions, and the rest of the sphere height values are unknown.

Thin Plate Splines can be used for finding a smooth height function in the 2-D spherical domain, which in turn guarantees a continuous differentiability. The spherical domain $(\alpha, \beta)$ is processed as a sheet, where continuity at the sheet endings is guaranteed.

Figure 2B:
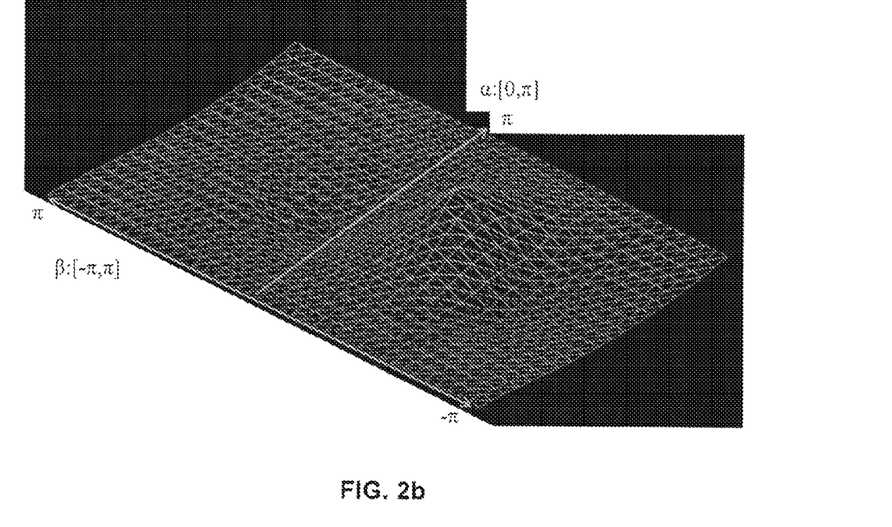
FIG. 2b shows RBF interpolation of height values for corresponding angular values in FIG. 2a in accordance with the present invention.

Let us define a function $f$, where $f: [0, \pi] \times [-\pi, \pi) \rightarrow R^+$ and $\forall Q_m \in Q, f(\alpha_m, \beta_m) = h_m$. Therefore, the problem is now simplified to finding an interpolator for function $f$ defined at n 2-D points, as illustrated by the grid shown in FIG. 2b. Function $f$ should be smooth and provide at least $C^1$ continuity (i.e., its first derivatives are continuous).

A possible approach for this interpolation problem is fitting a polynomial. This approach, however, has the disadvantages that: (1) an invertible system uniquely defining an interpolator that passes through all seed positions is not guaranteed, and (2) the interpolator might display erratic (e.g., bumpy and wiggly) behavior. Another option is dividing $[0, \pi] \times [-\pi, \pi)$ into patches and fitting piecewise polynomials to those patches where the $C^1$ continuity is guaranteed at the patch borders. However, that approach would not likely be applicable to cases having very scattered interpolation. On the other hand, RBF-based interpolators such as that exemplified in at least one embodiment of the present invention, offer several advantages over polynomial approaches such as: (1) there is no need to define a mesh of patches, (2) polyharmonic RBFs as defined have variational characteristics that make them very suitable for the interpolation of scattered data, and (3) the usage of a TPS as a radial function generates smooth results (e.g., $C^1$ continuity).

The approach embodied in the present invention begins with the definition of an energy function that measures the quality of the interpolation function, and finds a function that passes through the provided scattered data points and minimizes the energy function. The energy function, widely referred to as Bending Energy (BE), can be defined as $$I[f(\alpha,\beta)] = \iint (f_{\alpha\alpha}^2 + 2f_{\alpha\beta}^2 + f_{\beta\beta}^2) d\alpha d\beta.$$

In a given set of data points, a weighted summation of TPS functions centered about each data point provides the interpolation function that passed through the points exactly, providing $C^1$ continuity and minimizing BE. Therefore, one can define a radial function U in the form of a TPS as, $$U(r) = r^1 \log(r^2).$$

Then, the weighted sum of TPSs and a low-degree polynomial, which can be 0, would be, $$f(\alpha, \beta) = c_1 + c_2\alpha + c_3\beta + \sum_{i=1}^{n} w_i U(r(Q_i, (\alpha, \beta))).$$

Where the distance function r is defined to give spherical distance (unlike a regular TPS, which typically uses 2-D Cartesian distance), $$r((\alpha_1, \beta_1), (\alpha_2, \beta_2)) = \arccos((\sin(\alpha_1)\cos(\beta_1), \sin(\alpha_1)\sin(\beta_1), \cos(\alpha_1)) \cdot$$
$$(\sin(\alpha_2)\cos(\beta_2), \sin(\alpha_2)\sin(\beta_2), \cos(\alpha_2))).$$

Unknowns of the equation are $c_1, c_2, c_3$ and $w_1$ for each of the control points. However, the plate defined by $c_1, c_2, c_3$ should not bend based on $\beta$ value; as this might lead to a step-like behavior on the line where $\beta = -\pi$ (or at $\beta = \pi$), when the polar coordinates are converted back to the 3-D Cartesian coordinates. Therefore, $c_3$ should be accepted as 0, eliminating one of the unknowns. Given this, the problem can now be formulated by the following equation, $$L^{-1}Y = (W|c_1c_2)^T, \text{ where } W = (w_1 w_2 \ldots w_n).$$

The distance metric matrix K that evaluates function $U(r_{ij})$ ($r_{ij} = r(Q_i, Q_j)$) between control points is, $$K = \begin{bmatrix} U(r_{11}) & U(r_{12}) & \ldots & U(r_{1n}) \\ U(r_{21}) & U(r_{22}) & \ldots & U(r_{2n}) \\ \ldots & \ldots & \ldots & \ldots \\ U(r_{n1}) & U(r_{n2}) & \ldots & U(r_{nn}) \end{bmatrix}, n \times n.$$

Control point positions matrix P is, $$P = \begin{bmatrix} 1 & Q_{1,\alpha} \\ 1 & Q_{2,\alpha} \\ \ldots & \ldots \\ 1 & Q_{n,\alpha} \end{bmatrix}, n \times 2.$$

The matrix L composed of K, P and $P^T$ is, $$L = \begin{bmatrix} K & P \\ P^T & 0 \end{bmatrix}, (n+2) \times (n+2).$$

Control point heights matrix Y is, $$Y = [Q_{1,h} Q_{2,h} \ldots Q_{n,h} 0 0]^T.$$

This system satisfies the interpolation conditions, $$f(\alpha_i, \beta_i) = Q_{i,h}, i = 1, 2, \ldots n$$

together with the side conditions, $$w_1 + w_2 + \ldots + w_n = 0 \text{ and } w_1 Q_{1,\alpha} + w_2 Q_{2,\alpha} + \ldots + w_n Q_{n,\alpha} = 0.$$

The unknowns, which are $(W|c_1 c_2)$, are found by either: (1) finding the $L^{-1}$ and multiplying with Y, or (2) solving $L(W|c_1 c_2)^T = Y$ by LU decomposition (as L is symmetric). Function $f$ can then be computed for various $(\alpha, \beta)$ couples in order to generate a mesh around the OOI.

Figure 3:
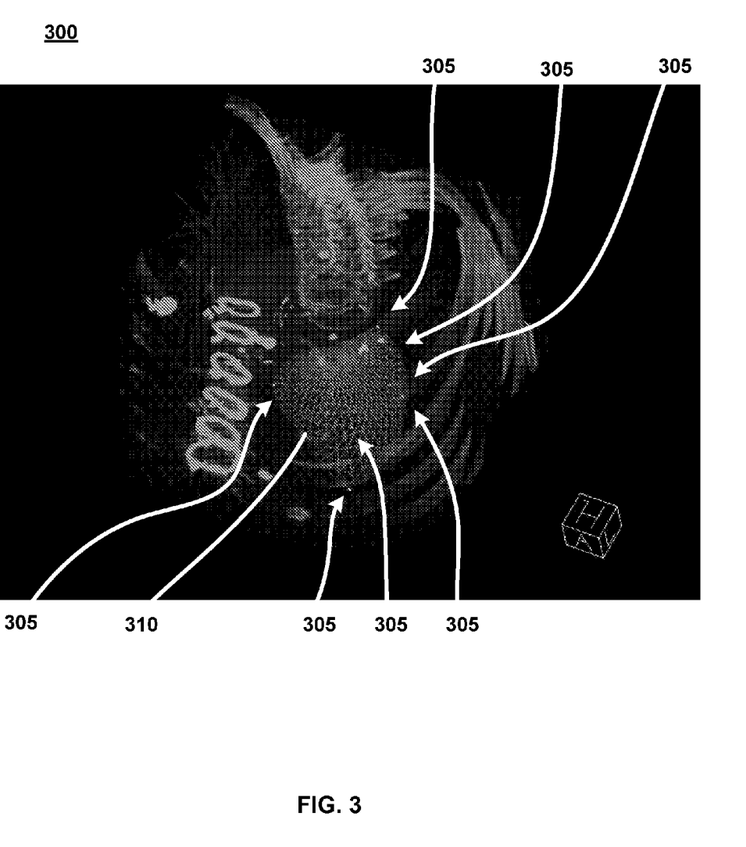
FIGS. 3-7 show exemplary surface extraction results obtained using one or more methods in accordance with the present invention.
Figure 4:
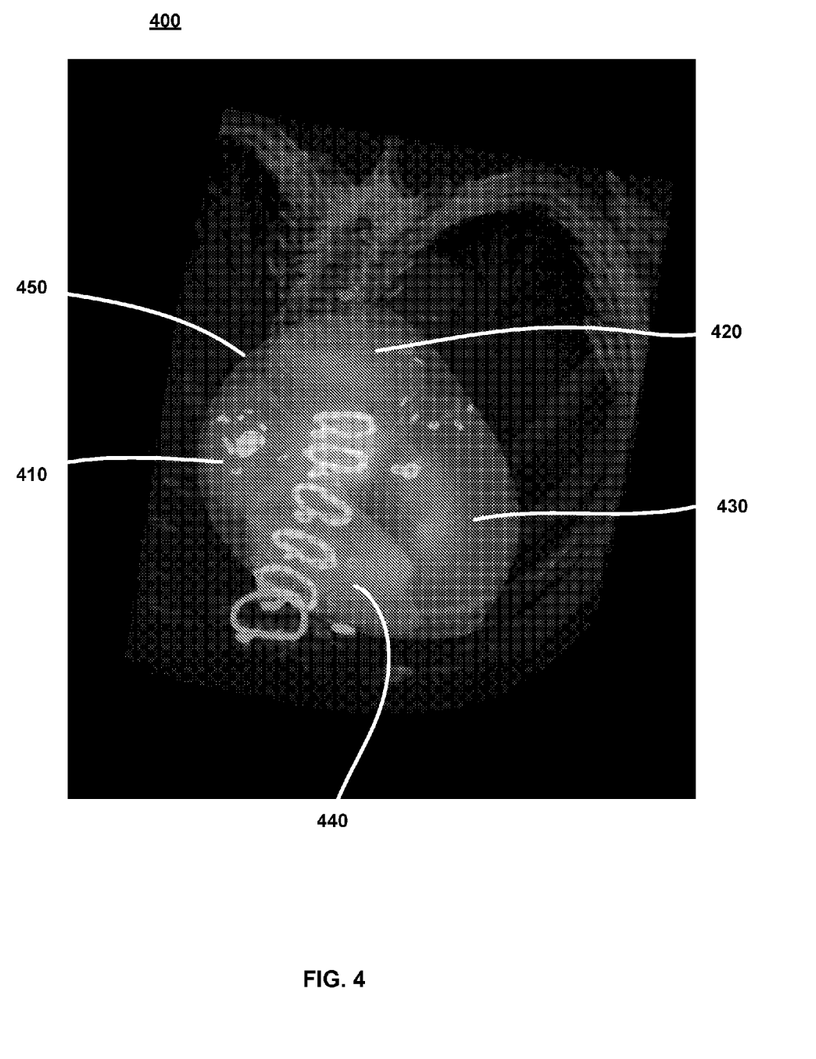
Figure 5:
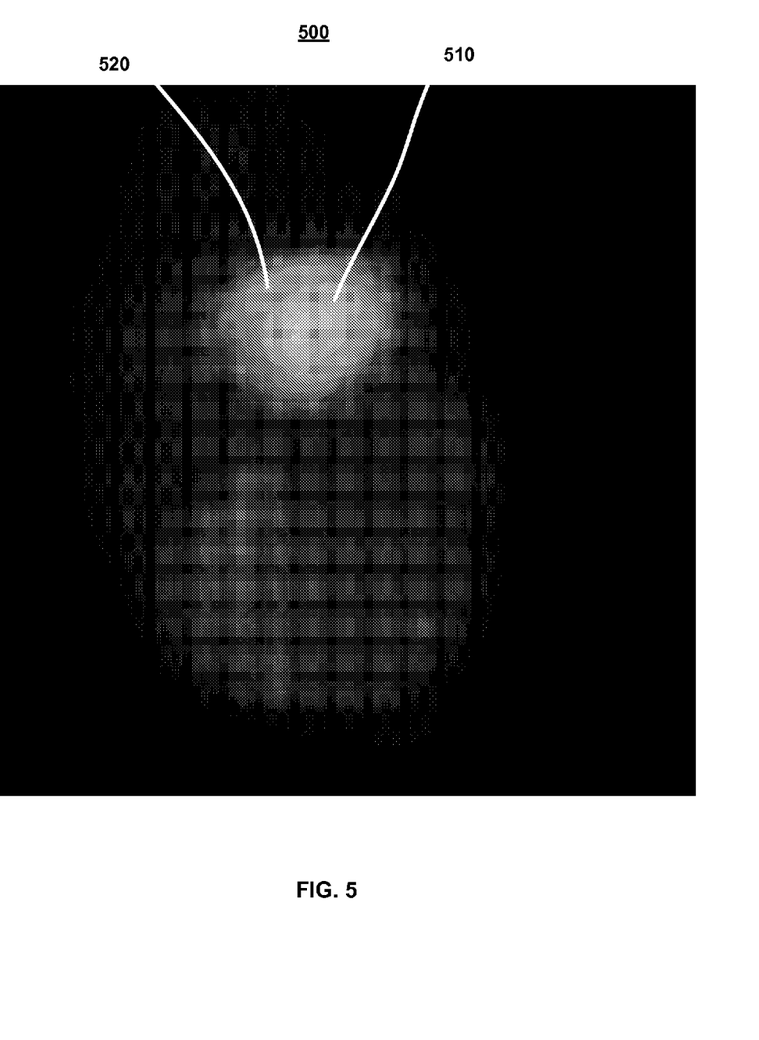
Figure 6:
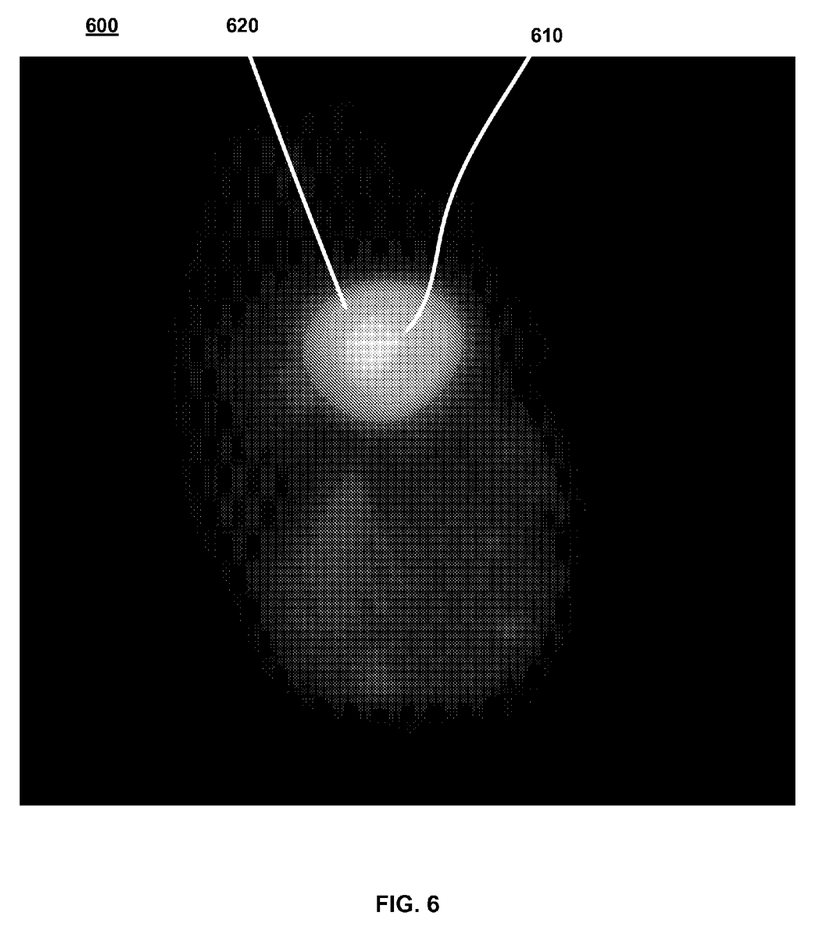
Figure 7:
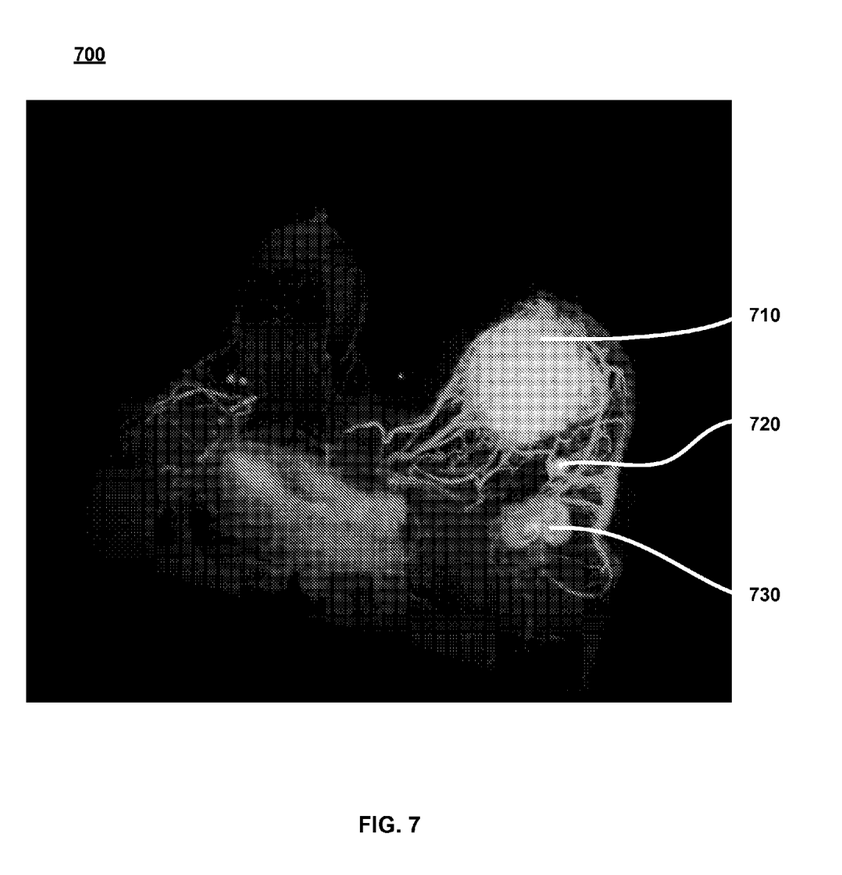

FIGS. 3-7 show exemplary surface extraction results obtained using one or more methods in accordance with the present invention. FIG. 3 illustrates that in a CT image 300, for example, only six or seven surface seed points 305 are needed for extraction of the epicardial surface of the left ventricle (shown as a grid surface) 310 from the CT image data. FIG. 4 shows in another CT image 400 starting at the top left and going clockwise, each heart chamber—right atrium (RA) 410, left atrium (LA) 420, left ventricle (LV) 430, right ventricle (RV) 440—and the whole heart (outer surface) 450 as extracted using the methods embodied in the present invention. FIGS. 5 and 6 show other CT images 500, 600, respectively, of a left ventricular blood pool (inner surface) 510, 610 and myocardium (outer surface) 520, 620 as extracted from SPECT image data. FIG. 7 shows an MR image 700 of several breast tumor masses (located on right half of Figure) 710, 720, 730 as extracted from MR image data and shown relative to vasculature and ducts.

Figure 8:
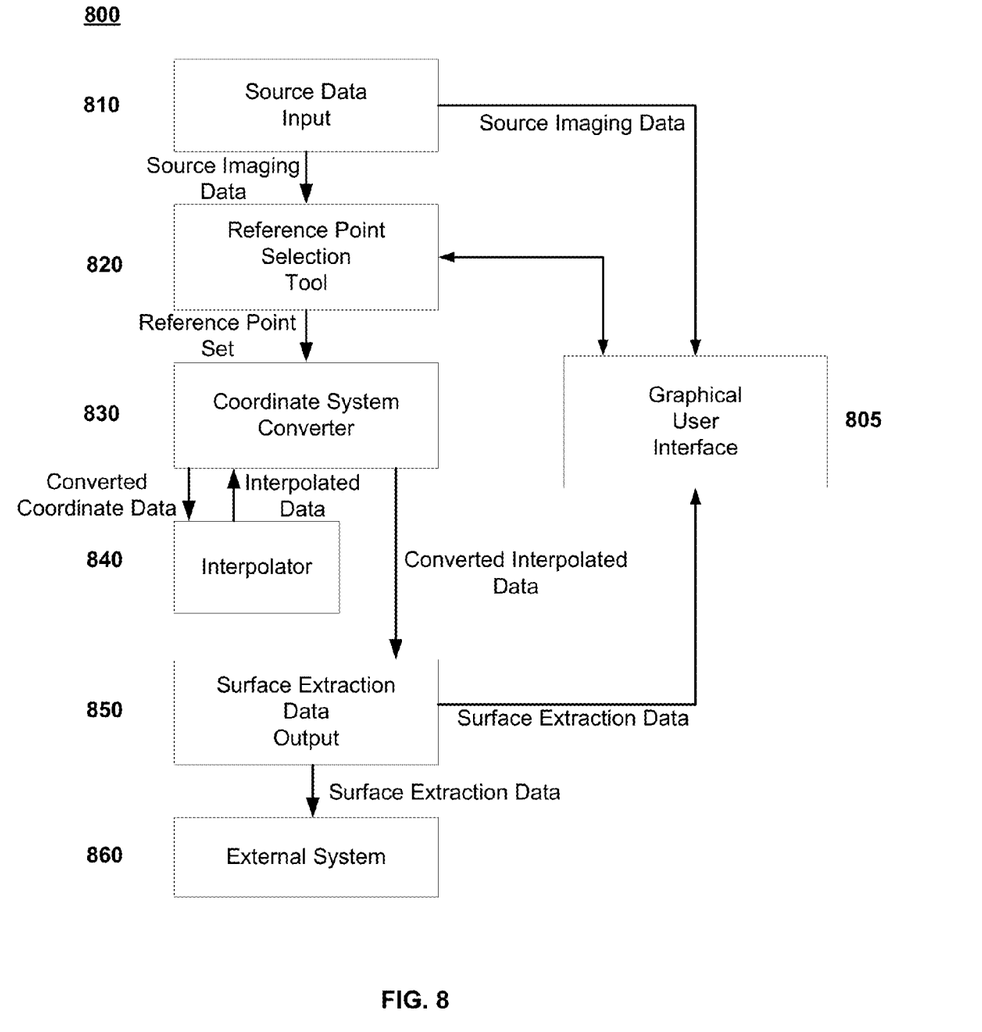
FIG. 8 shows an exemplary embodiment of a system for providing surface extraction from a scattered point set in accordance with the present invention.

FIG. 8 depicts a system 800 for a semi-automated surface extraction based delineation of an OOI from a 3-D image data set, in accordance with one or more exemplary embodiments of the present invention. This system 800 can be used to extract or reconstruct the surface of an OOI using, for example, the method described in FIG. 1. An imaging specialist, for example, or other qualified person(s) can utilize a graphical user interface (GUI) 805 to view source data (e.g., 3-D medical image data sets) received in the system via a source data input 810. The source data input 810 may also provide source data to a reference point selection tool 820. The imaging specialist can use the GUI 800, in conjunction with the reference point selection tool 820 to select points or seeds [105, 110, 115], and to produce a reference set thereof. The reference point set may be generated in a 3-D Cartesian coordinate system [120], for example. This reference point set can then be supplied to a coordinate system converter 830, where it may be converted into a polar coordinate system [125]. The converted coordinate data can then be sent to an interpolator 840 for surface reconstruction/extraction. The interpolator 840, which can, for example, be an RBF interpolator, can receive the converted coordinate data and use it to calculate additional spatial parameters such as grid heights, for example, utilizing TPS-based interpolation [130, 135]. The interpolated data can then be sent back to the coordinate system converter 830 for conversion to a 3-D Cartesian coordinate system [140]. As an alternative, the system may utilize separate coordinate system converters for conversion to and from a polar coordinate system, respectively. The converted interpolated data, having been converted to a 3-D Cartesian coordinate system, can then be supplied to a surface extraction data output 850. This output can provide surface extraction data to the GUI 805 for visualization or displaying on the input source data volume [145]. The surface extraction data may also be sent via the surface extraction data output 850, to another external system 860 for visualization [145] or further processing to include, for example, recognition, feature extraction, and machine classification. The system may further include a storage device (not shown) for storing software instructions for performing a method of surface extraction based delineation of an OOI from a data set. The imaging specialist can view and assess the sufficiency of the surface extraction data, as it is displayed via the GUI 805 [150]. Should additional enhancement or clarification of the resulting image be desired [150], the imaging specialist can supply one or more additional surface seeds [110] using the GUI 805 and the reference point selection tool 820, and then iterate the process described above in order to produce a resulting image of the OOI that is relatively more refined or enhanced.

An exemplary surface-fitting module or component in accordance with the present invention may include one or more of the previously discussed components such as the reference point selection tool 820, coordinate system converter 830, interpolator 840, and surface extraction data output 850. Such a surface-fitting module can operate according to software instructions retrieved from one or more computer readable medium(s). The software instructions, when executed by, for example, a processor in the surface-fitting module, cause the surface-fitting module to perform [105, 110, 120, 125, 130, 135, 140] the OOI surface delineation methods as described above. In operation, electronic data are passed between adjacent nodes or components, which may be networked or may communicate via a bus or any other suitable data communication system. A node processor can be a computer, a single processor on a device with multiple processors, or any suitable machine capable of making the described computations and sending and receiving the described data. The value (or data content) of each message is determined according to a compressed message update rule. Received messages may be stored by the processor in an electronic memory, such as, for example, RAM, non-volatile storage, a database or any suitable data store.

Embodiments of the method, system, computer program product, and computer readable media for delineating the surface and borders of 3-D objects of interest may be implemented on one or more general-purpose computers, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any device or process capable of implementing the functions or processes described herein can be used to implement embodiments of the method, system, computer program product or computer readable media for 3-D OOI surface delineation.

Furthermore, embodiments of the disclosed method, software, and computer program product (or computer readable media) for 3-D OOI surface delineation may be readily implemented, fully or partially, in software using, for example, object or object-oriented software development environments that provide portable source code that can be used on a variety of one or more computers platforms. Alternatively, embodiments of the disclosed method for 3-D OOI surface delineation can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, computer program product and computer readable media for matching using degree distribution can be implemented in hardware and/or software using any known or later developed systems or structures, devices and/or software by those of ordinary skill in the applicable art from the functional description provided herein and with a general basic knowledge of the computer arts.

Moreover, embodiments of the disclosed method for 3-D OOI surface delineation can be implemented in software stored on computer readable media (or provided as a computer program product) and adapted to be executed on a programmed general-purpose computer, a special purpose computer, a microprocessor, or the like. Also, the 3-D OOI surface delineation method of this invention can be implemented as a program embedded on a personal one or more computers such as a JAVA or CGI script, as a resource residing on a server or graphics workstation, as a routine embedded in a dedicated processing system, or the like. The method and system can also be implemented by physically incorporating the method for 3-D OOI surface delineation into a software and/or hardware system, such as the hardware and software systems of an image processing system, PACS, Geographic Information System (GIS), or other suitable system.

Exemplary surface extraction results were obtained using one or more systems and methods in accordance with the present invention, for evaluation purposes. Twenty (20) CT 3-D data couples were used for the evaluation; each data couple consisted of end-diastolic (ED) and end-systolic (ES) datasets for a given patient. A CT (e.g., Dual Source Definition, Siemens®) scan was performed with the following parameters: rotation time of 335 ms, B25 type kernel (i.e., dedicated cardiac kernel), slice thickness of 0.75 mm, temporal resolution of 82 ms, tube current of 261 mAs/rot, and tube voltage of 120 kV.

The accuracy of the surface extraction or surface segmentation results was evaluated by comparing extracted meshes with verified reference meshes delineated by a medical expert using a manual segmentation tool (e.g., Siemens® Cardiac CT). For purposes of comparing a given extracted mesh to a reference mesh, (1) equally sampled points from the given mesh were chosen and their shortest respective distances to the reference mesh were found, and (2) an average of these distances was taken to determine the surface segmentation error. In Table 1, surface measurement errors for an endocardium (Endo) and an epicardium (Epi) for 4-10 seeds are provided. The distribution—or standard deviation (SD)—of the average distance between the given segmented surface points and the reference surface points for each edge detector is given.

TABLE 1

Surface Measurement Errors: mean error ± SD

| Seed # | 4 | 5 | 6 | 7 | 8 | 9 | 10 |
|---|---|---|---|---|---|---|---|
| Epi (mm) | 3.81 ± 0.70 | 2.95 ± 0.57 | 2.42 ± 0.42 | 2.04 ± 0.26 | 1.67 ± 0.19 | 1.53 ± 0.20 | 1.32 ± 0.27 |
| Endo (mm) | 3.77 ± 0.30 | 2.85 ± 0.25 | 2.36 ± 0.26 | 1.94 ± 0.22 | 1.69 ± 0.17 | 1.52 ± 0.14 | 1.35 ± 0.14 |

In order to calculate the volume of a given mesh generated using one or more systems and methods in accordance with the present invention, the mesh surface was triangulated and the volumes of the tetrahedrons that were defined using the triangle faces and the object center were summed. The volumes of reference meshes were calculated using a semi-automated segmentation tool (e.g., Siemens® Cardiac CT) during a "ground truth" extraction phase. In Table 2, LV cavity volume errors for ED and ES (EDV and ESV respectively), and ejection fraction (EF) errors for 4-10 seeds, all in percentages, are reported.

TABLE 2

Volumetric Measurement Errors: mean error ± SD

| Seed # | 4 | 5 | 6 | 7 | 8 | 9 | 10 |
|---|---|---|---|---|---|---|---|
| EDV (%) | 38.5 ± 22 | 27.6 ± 25 | 19.4 ± 23 | 16.9 ± 15 | 14.0 ± 14 | 10.7 ± 13 | 9.5 ± 12 |
| ESV (%) | 56.9 ± 60 | 32.7 ± 38 | 22.4 ± 27 | 15.4 ± 21 | 12.2 ± 22 | 9.6 ± 22 | 6.9 ± 20 |
| EF (%) | −5.96 ± 15 | −4.90 ± 14 | −3.11 ± 13 | −1.89 ± 10 | −1.71 ± 10 | −2.15 ± 10 | −1.66 ± 10 |

The semi-automated segmentation tool may be implemented in C++, for example, and can complete segmentation of a surface using up to 15 seed points in less than 40 ms when executed on a 2.0 GHz Intel® Core 2 Duo CPU, or equivalent processor.

An exemplary system for surface extraction based on delineation of an object from a data set may include (i.e., comprise): a storage adapted to store software instructions for performing a method of surface extraction based on delineation of an object from a data set; and a surface-fitting module coupled to the storage and adapted to execute the software instructions and perform operations including: receiving a series of selected reference points; generating a reference set comprising the selected reference points, the reference set being generated within a first coordinate system; converting the generated reference set from the first coordinate system to a second coordinate system; calculating spatial parameters using the converted reference set; converting the calculated spatial parameters from the second coordinate system to the first coordinate system; and supplying the converted calculated spatial parameters as output. The system may further comprise a graphical user interface adapted to receive the converted calculated spatial parameters as output for displaying. The surface-fitting module of the system may comprise a reference point selection tool, a coordinate system converter, an interpolator, and a surface extraction data output.

An exemplary method of surface extraction based on delineation of an object from a data set (e.g., a 3-D image data set) may include (i.e., comprise): receiving a series of selected reference points; generating a reference set comprising the selected reference points, the reference set being generated within a first coordinate system; converting the generated reference set from the first coordinate system to a second coordinate system; calculating spatial parameters using the converted reference set; converting the calculated spatial parameters from the second coordinate system to the first coordinate system; and supplying the converted calculated spatial parameters as output. The method may comprise supplying the converted calculated spatial parameters as output to a graphical user interface for displaying. The converting the generated reference set from the first coordinate system to a second coordinate system; calculating spatial parameters using the converted reference set; converting the calculated spatial parameters from the second coordinate system to the first coordinate system; supplying the converted calculated spatial parameters as output; and supplying the converted calculated spatial parameters as output to a graphical user interface for displaying may be accomplished in 10 milliseconds (ms) or less. The calculating spatial parameters using the converted reference set may be accomplished using a radial-basis function interpolator with a thin plate spline radial function. The radial-basis function interpolator can determine height values corresponding to respective angular values in the second coordinate system. The first coordinate system can be a Cartesian coordinate system, and the second coordinate system can be a polar coordinate system. The selected reference points can be unordered. The series of selected reference points may contain less than 10 reference points, and may contain less than 5 reference points. The exemplary method may be accomplished independently of imaging modality.

An exemplary computer readable medium may have software instructions stored thereon for programming a computer to perform surface reconstruction using a data set, the software instructions, when executed by a processor, cause the processor to perform operations including (i.e., comprising): receiving a series of selected reference points; generating a reference set comprising the selected reference points, the reference set being generated within a first coordinate system; converting the generated reference set from the first coordinate system to a second coordinate system; calculating spatial parameters using the converted reference set; converting the calculated spatial parameters from the second coordinate system to the first coordinate system; and supplying the converted calculated spatial parameters as output. The processor operations may further comprise supplying the converted calculated spatial parameters as output to a graphical user interface for displaying.

Additionally, means for manufacturing, means for installing, and means for operating the system as described above are contemplated within the scope of the invention.

The entire disclosures and contents of each reference, patent, and patent application referred to above are expressly incorporated herein by reference. Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, since numerous modifications will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for surface extraction based on delineation of an object from a data set, the system comprising:
   a storage adapted to store software instructions for performing a method of surface extraction based on delineation of an object from a data set; and
   a surface-fitting module coupled to the storage and adapted to execute the software instructions and perform operations including:
      receiving a series of user selected reference points related to an object in a 3-D image data set;
      generating a reference set comprising the user selected reference points, the reference set being generated within a first coordinate system;
      converting the generated reference set from the first coordinate system to a second coordinate system;
      calculating spatial parameters using the converted reference set;
      converting the calculated spatial parameters from the second coordinate system to the first coordinate system; and
      supplying the converted calculated spatial parameters delineating a surface of the object in the 3-D image data set as output.

2. The system of claim 1, further comprising a graphical user interface.

3. The system of claim 2, wherein the graphical user interface is adapted to receive the converted calculated spatial parameters as output for displaying.

4. The system of claim 1, wherein the surface-fitting module comprises a reference point selection tool, a coordinate system converter, an interpolator, and a surface extraction data output.

5. The system of claim 4, wherein the interpolator is an exact interpolator.

6. The system of claim 1, wherein the supplying the converted calculated spatial parameters delineating the surface of the object in the 3-D image data set as output further comprises supplying the converted calculated spatial parameters delineating an external surface of the object in the 3-D image data set as output.

7. The system of claim 1, wherein the supplying the converted calculated spatial parameters delineating the surface of the object in the 3-D image data set as output further comprises supplying the converted calculated spatial parameters delineating an internal surface of the object in the 3-D image data set as output.

8. A method of surface extraction based on delineation of an object from an image data set, the method comprising:
   receiving a series of user selected reference points related to an object in a 3-D image data set;
   generating a reference set comprising the user selected reference points, the reference set being generated within a first coordinate system;
   converting the generated reference set from the first coordinate system to a second coordinate system;
   calculating spatial parameters using the converted reference set;
   converting the calculated spatial parameters from the second coordinate system to the first coordinate system; and
   supplying the converted calculated spatial parameters delineating a surface of the object in the 3-D image data set as output.

9. The method of claim 8, wherein supplying the converted calculated spatial parameters delineating a surface of the object in the 3-D image data set as output comprises supplying the converted calculated spatial parameters delineating a surface of the object in the 3-D image data set as output to a graphical user interface for displaying.

10. The method of claim 9, wherein the converting the generated reference set from the first coordinate system to a second coordinate system; calculating spatial parameters using the converted reference set; converting the calculated spatial parameters from the second coordinate system to the first coordinate system; supplying the converted calculated spatial parameters delineating a surface of the object in the 3-D image data set as output; and supplying the converted calculated spatial parameters delineating a surface of the object in the 3-D image data set as output to a graphical user interface for displaying are accomplished in 10 milliseconds or less.

11. The method of claim 8, wherein the calculating spatial parameters using the converted reference set is accomplished using a radial-basis function interpolator with a thin plate spline radial function.

12. The method of claim 11, wherein, the radial-basis function interpolator determines height values corresponding to respective angular values in the second coordinate system.

13. The method of claim 8, wherein the first coordinate system is a Cartesian coordinate system.

14. The method of claim 8, wherein the second coordinate system is a polar coordinate system.

15. The method of claim 8, wherein the user selected reference points are unordered.

16. The method of claim 8, wherein the series of user selected reference points contains 10 or less reference points.

17. The method of claim 8, wherein the series of user selected reference points contains 3 reference points.

18. The method of claim 8, wherein the method is accomplished independently of an imaging modality used to obtain the image data set.

19. A non-transitory computer readable medium having software instructions stored thereon for programming a computer to perform surface reconstruction using a data set, the software instructions, when executed by a processor, cause the processor to perform operations comprising:
   receiving a series of user selected reference points related to an object in a 3-D image data set;
   generating a reference set comprising the user selected reference points, the reference set being generated within a first coordinate system;
   converting the generated reference set from the first coordinate system to a second coordinate system;
   calculating spatial parameters using the converted reference set;

converting the calculated spatial parameters from the second coordinate system to the first coordinate system; and supplying the converted calculated spatial parameters delineating a surface of the object in the 3-D image data set as output.

20. The non-transitory computer readable medium of claim 19, wherein supplying the converted calculated spatial parameters delineating a surface of the object in the 3-D image data set as output comprises supplying the converted calculated spatial parameters delineating a surface of the object in the 3-D image data set as output to a graphical user interface for displaying.

* * * * *

UNITED STATES PATENT AND TRADEMARK OFFICE
CERTIFICATE OF CORRECTION

PATENT NO. : 9,177,373 B2  
APPLICATION NO. : 13/576008  
DATED : November 3, 2015  
INVENTOR(S) : Engin Dikici and Richard D. White Page 1 of 1

It is certified that error appears in the above-identified patent and that said Letters Patent is hereby corrected as shown below:

On the Title Page:

"item (76)" should read -- item (75) --.

Add item (73), the Assignee information should read as follows:

-- (73) Assignee: University of Florida Research Foundation, Inc. --.

Signed and Sealed this
Twenty-eighth Day of June, 2016

Michelle K. Lee
*Director of the United States Patent and Trademark Office*